(12) United States Patent
Barkow et al.

(10) Patent No.: US 11,787,285 B2
(45) Date of Patent: Oct. 17, 2023

(54) METHOD FOR CONTROLLING A FILLING PROCESS OF A MOTOR VEHICLE TANK AND MOTOR VEHICLE TANK FOR CARRYING OUT THE METHOD

(71) Applicant: KAUTEX TEXTRON GMBH & CO. KG, Bonn (DE)

(72) Inventors: Axel Barkow, Huerth (DE); Dirk Eulitz, Bonn (DE); Stefan Wind, Hennef (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 260 days.

(21) Appl. No.: 17/250,925

(22) PCT Filed: Sep. 20, 2019

(86) PCT No.: PCT/EP2019/075346
§ 371 (c)(1),
(2) Date: Mar. 29, 2021

(87) PCT Pub. No.: WO2020/064550
PCT Pub. Date: Apr. 2, 2020

(65) Prior Publication Data
US 2021/0339623 A1    Nov. 4, 2021

(30) Foreign Application Priority Data

Sep. 28, 2018   (DE) .................... 10 2018 124 103.8

(51) Int. Cl.
*B60K 15/035*   (2006.01)
*B60K 15/04*    (2006.01)
(Continued)

(52) U.S. Cl.
CPC ........ *B60K 15/03519* (2013.01); *B60K 15/04* (2013.01); *B67D 7/08* (2013.01);
(Continued)

(58) Field of Classification Search
CPC . B67D 7/08; B67D 7/34; B67D 7/348; B60K 2015/03203; B60K 2015/03361
See application file for complete search history.

(56) References Cited

U.S. PATENT DOCUMENTS 10,562,390 B2 *  2/2020  Eulitz .................... B60K 15/03
10,994,604 B2    5/2021  Wolf et al.
(Continued)

FOREIGN PATENT DOCUMENTS

CN    206436819    8/2017
CN    108474683    8/2018
(Continued)

OTHER PUBLICATIONS

EP0965992A2 and machine translation thereof (Year: 2023).*
(Continued)

*Primary Examiner* — Timothy P. Kelly
(74) *Attorney, Agent, or Firm* — Grossman, Tucker, Perreault & Pfleger, PLLC

(57) ABSTRACT

A method for controlling a filling process of a motor vehicle tank comprising the following steps: determine a geographical location of the motor vehicle tank; determining, by means of a tank control device, whether the geographical location of the motor vehicle tank is within a predetermined geographical area; and determining a shut-off filling volume dependent on the geographical location of the motor vehicle tank, if the geographical location of the motor vehicle tank is within the predetermined geographical area.

19 Claims, 3 Drawing Sheets

(51) Int. Cl.
 *B67D 7/08* (2010.01)
 *B60K 15/03* (2006.01)
(52) U.S. Cl.
 CPC ............... *B60K 2015/03203* (2013.01); *B60K 2015/03217* (2013.01); *B60K 2015/03256* (2013.01); *B60K 2015/03361* (2013.01); *B60K 2015/03566* (2013.01); *B60K 2015/03576* (2013.01)

(56) References Cited

U.S. PATENT DOCUMENTS

| | | | |
|---|---|---|---|
| 2016/0016468 A1* | 1/2016 | Stanek | B60K 28/10 903/902 |
| 2016/0169728 A1 | 6/2016 | Romstoeck et al. | |
| 2017/0282906 A1 | 10/2017 | Abe et al. | |
| 2018/0099859 A1 | 4/2018 | Dudar | |
| 2020/0271081 A1* | 8/2020 | Mulshine | B60R 25/33 |

FOREIGN PATENT DOCUMENTS

| | | |
|---|---|---|
| DE | 19834671 | 2/2000 |
| DE | 102015214568 | 2/2017 |
| DE | 102016008696 | 2/2017 |
| DE | 102015217609 | 3/2017 |
| JP | 2010269648 | 12/2010 |

OTHER PUBLICATIONS

DE102015214568B4 with AI translation (Year: 2023).*
Insideevs Editorial Team, "U.S. Bmw i3 REx Actually Has 2.4 Gallon Gas Tank, But Clever Software Limits Fueling To 1.9 Gallons", download from www.bmwblog.com on May 27, 2019.
English translation of International Search Report from corresponding PCT Appln. No. PCT/EP2019/075346, dated Mar. 6, 2020.
English translation of International Preliminary Report on Patentability from corresponding PCT Appln. No. PCT/EP2019/075346, dated Apr. 8, 2021.

* cited by examiner

METHOD FOR CONTROLLING A FILLING PROCESS OF A MOTOR VEHICLE TANK AND MOTOR VEHICLE TANK FOR CARRYING OUT THE METHOD

FIELD

The present disclosure relates to a method for controlling a filling process of a motor vehicle tank. The present disclosure relates to a method for controlling a filling process of a motor vehicle tank.

BACKGROUND

Hybrid vehicles, and in particular plug-in hybrid electric vehicles (abbreviated as PHEVs in the following), have a long range that can be covered purely electrically. In cities, so-called environmental zones are increasingly being set up in which the operation of a motor vehicle with an internal combustion engine is prohibited. Therefore, long distances are covered using purely electric propulsion without activating the combustion engine and burning fuel. One of the PHEV's batteries is recharged as needed so that pure electric driving can continue.

Prior art refueling systems do not have any devices that facilitate or assist the driver or refueler of a motor vehicle in refueling as needed. Therefore, it is common for a driver to either completely fill his motor vehicle (abbreviated as motor vehicle in the following) with fuel, or to fill the motor vehicle tank up to this amount depending on the amount of money carried, or to estimate how much fuel is necessary to cover a distance and to fill the corresponding amount of fuel into the motor vehicle tank.

Meanwhile, there are efforts to allow motor vehicles to carry only a limited amount of fuel in predetermined geographical areas, so that drivers of vehicles, and PHEVs in particular, are motivated to use the vehicles preferably in electric drive mode.

Corresponding regulations lead to the problem that PHEVs have to be equipped with different tank sizes for different geographical areas.

SUMMARY

The present disclosure is based on the task of providing a method for controlling a filling process of a motor vehicle tank, with which this problem is solved and which, in addition, enables a more convenient filling process of a motor vehicle tank.

More precisely, the task underlying the present disclosure is solved by a method for controlling a filling process of a motor vehicle tank, wherein the motor vehicle tank has a filler tube which opens into the motor vehicle tank and via which the motor vehicle tank can be filled by means of a filling device. The fuel tank further comprises a service and/or refueling vent valve that is electrically and/or electromagnetically actuable between an open position, in which the motor vehicle tank is at least indirectly fluidly connected to the atmosphere by means of the service and/or refueling vent valve, and a closed position, in which the motor vehicle tank is fluidly isolated from the atmosphere by means of the service and/or refueling vent valve. Furthermore, the motor vehicle tank has an electrically and/or electromagnetically actuable actuator by means of which termination of the filling process of the motor vehicle tank can be initiated. Further, the motor vehicle tank includes a level sensor for determining a filling level of the motor vehicle tank. Furthermore, the motor vehicle tank has a tank control device which is signal-coupled to the service and/or refueling vent valve and to the actuator by means of a first data exchange connection and to the filling level sensor by means of a second data exchange connection. The method according to the disclosure has the following process steps:

- Determine a geographical location of the motor vehicle tank;
- determining, by means of the tank control device, whether the geographical location of the motor vehicle tank is within a predetermined geographical area; and
- Determining a shut-off filling volume dependent on the geographical location of the motor vehicle tank, if the geographical location of the motor vehicle tank is within the predetermined geographical area.

The method according to the disclosure has the advantage that the motor vehicle tank of a motor vehicle or of a PHEV can be filled only up to a predetermined maximum filling quantity depending on the geographical location of the motor vehicle or of the PHEV and thus depending on the geographical location of the motor vehicle tank, the maximum filling quantity corresponding to a predetermined shut-off filling volume of the motor vehicle tank. If, for example, in a city the vehicles moving in the geographical area of the city may only be filled and moved with a predetermined maximum filling quantity of fuel (for example 36 liters), the method according to the disclosure for controlling a filling process of the motor vehicle tank offers the advantage that the filling process of the motor vehicle tank is automatically stopped depending on the geographical location of the motor vehicle tank at a predetermined shut-off filling volume corresponding to the maximum filling quantity. After reaching the shut-off filling volume, refueling of the motor vehicle tank is not possible if the motor vehicle tank is in the predetermined geographical area. However, if the motor vehicle tank is not located in a geographical area that has limitations on the amount of fuel that can be carried, the motor vehicle tank can be filled as usual up to a maximum filling volume.

Thus, the present method has the advantage that only one motor vehicle tank needs to be offered, regardless of the locations where the motor vehicle or PHEV is used.

Of course, it is also possible that different shut-off filling volumes are defined for different geographical areas, which can be stored in an electronic memory of the tank control device. Furthermore, it is of course also possible that the shut-off filling volume(s) associated with a geographical area(s) can be changed. Thus, the method according to the disclosure offers the advantage that the motor vehicle tank can continue to be used even in the event of a change in a legal situation, for example.

The geographical location of the motor vehicle tank is preferably determined by means of an electronic unit, for example by means of a navigation system.

In the method step of determining the geographical location of the motor vehicle tank, location data representing the geographical location is preferably stored in an electronic data memory of an electronic unit. This location data representing the geographical location of the motor vehicle tank is preferably transmitted to the tank control device.

The location data is preferably geographical location data indicating the geographical location of the motor vehicle tank and thus of the motor vehicle in which the motor vehicle tank is installed.

The filling level sensor is designed to transmit the data representing a filling level of the motor vehicle tank determined by means of the filling level sensor to the tank control device via the second data exchange connection.

Preferably, a data exchange connection is established between the tank control device and an electronic data memory of an electronic unit, which may be designed as a navigation system, for example.

Preferably, the method further comprises the following method steps:
- Determining a filling volume of the motor vehicle tank by means of a filling level sensor;
- comparing the filling volume of the motor vehicle tank with the predetermined shut-off filling volume by means of the tank control device; and
- Outputting, by means of the tank control device, a signal dependent on the comparison of the filling volume of the motor vehicle tank with the predetermined shut-off filling volume.

The filling volume of the motor vehicle tank is the amount of fuel located in the motor vehicle tank.

The signal dependent on the comparison of the filling volume of the motor vehicle tank with the predetermined shut-off filling volume is preferably an opening signal to a service and/or refueling vent valve and/or a closing signal to an actuator by means of which termination of a filling process can be initiated. Further preferably, the signal dependent on the comparison of the filling volume of the motor vehicle tank with the predetermined shut-off filling volume is a signal to inform the driver of the motor vehicle whether refueling of the motor vehicle tank is possible.

Preferably, the method further comprises the following method steps:
- determining whether a filling operation of the motor vehicle tank is to be initiated;
- outputting an opening signal from the tank control device to a service and/or refueling vent valve when the filling volume of the motor vehicle tank is less than the predetermined shut-off filling volume;
- moving the service and/or refueling vent valve to its open position upon receipt of the opening signal; and
- outputting a closing signal from the tank control device to an actuator when the filling volume of the motor vehicle tank has reached or exceeded the predetermined shut-off filling volume.

The start of the filling process is preferably initiated by means of the tank control device and/or by means of an electronic unit having an electronic data memory.

The start of the filling process is preferably initiated by means of the tank control device and/or by means of an electronic unit having an electronic data memory.

Preferably, the method further comprises the following method steps:
- outputting the opening signal from the tank control device to the service and/or refueling vent valve when the geographical location of the motor vehicle tank is outside the predetermined geographical area and the filling volume of the motor vehicle tank is less than a predetermined maximum filling volume;
- moving the service and/or refueling vent valve to its open position upon receipt of the opening signal; and
- Outputting the closing signal from the tank control device to the electrically and/or electromagnetically actuable actuator when the filling volume of the motor vehicle tank (10) has reached or exceeded the predetermined maximum filling volume.

The maximum filling volume is preferably adjustable via software. Further preferably, the maximum filling volume is set to a predetermined percentage of a capacity of the motor vehicle tank. For example, the maximum filling volume is set to 80% of the capacity. Of course, the maximum filling volume can also be set to other percentages of the capacity, for example 60% or 70% or 85% or 90%. This setting is made in particular by storing the data representing the maximum filling volume in a memory.

Preferably, the at least one actuator is the service and/or refueling vent valve disposed in the motor vehicle tank.

The service and/or refueling venting valve is also abbreviated as FLVV (from the English for fuel limit venting valve).

When the closing signal is received, the FLVV is used to close a vent line that usually opens to atmosphere through an activated carbon filter. By transmitting the closing signal to the FLVV, valves that are required anyway for venting the motor vehicle tank are used to initiate termination of the filling process. This has the advantage that additional components do not have to be used in the motor vehicle tank, so that the complexity of the motor vehicle tank is reduced.

Furthermore, by using an electrically and/or electromagnetically operable service and/or refueling vent valve, it is achieved that the service vent functionality and the refueling vent functionality can be provided by a single component. In conventional methods known from the prior art, two separate valves are required to realize the operation venting functionality and the refueling venting functionality.

Further preferably, the at least one actuator is a check valve arranged in and/or on the filler tube of the motor vehicle tank.

The check valve is also abbreviated as ICV (from the English for inlet check valve).

A corresponding method in which the closing signal is sent to a check valve arranged in the filling tube or on the filling tube has the advantage that no internal pressure needs to be built up in the motor vehicle tank to end the filling process, so that the motor vehicle tank is essentially pressureless after the filling process has ended. Since no internal pressure is built up, the motor vehicle tank also does not expand, so that the accuracy of the fill quantity determination in the motor vehicle tank is increased. Furthermore, the fact that no pressure needs to be built up in the motor vehicle tank to end the filling process offers the advantage that the amount of fuel filled into the motor vehicle tank corresponds more precisely to the amount of fuel to be filled into the motor vehicle tank. This is because the volume of gas remaining in the motor vehicle tank does not act as a compressible gas spring. The amount of fuel filled into the filler tube can be determined very precisely, so that the accuracy of the amount of fuel filled is increased.

Preferably, the at least one actuator is a shut-off valve arranged between the motor vehicle tank and an activated carbon filter and/or between the activated carbon filter and the atmosphere.

The isolation valve is also abbreviated as FTIV (from the English for fuel tank isolation valve). If the shut-off valve is located between the activated carbon filter and the atmosphere, it is also called OBD valve.

By driving the FTIV and using the FTIV to initiate the termination of the filling process, components necessary to terminate the filling process are used in a motor vehicle, especially in a PHEV. Since the FTIV is checked on a regular basis, for example during the operation of the motor vehicle in test cycles and as part of a TUV inspection, increased operational safety is achieved by using the FTIV to initiate a termination of the filling process.

Preferably, the at least one actuator is an interference body insertable into a filler tube of the motor vehicle tank.

The interfering body can, for example, be pushed and/or or swiveled into the filler tube so that the free cross-section of the filler tube is reduced. By triggering the interfering body to end the filling process, fuel filled into the filler tube accumulates in it until a shut-off hole of the nozzle is reached, which ends the refueling process. A corresponding method in which the closing signal is sent to a check valve arranged in the filling tube or on the filling tube has the advantage that no internal pressure needs to be built up in the motor vehicle tank to end the filling process, so that the motor vehicle tank is essentially pressureless after the filling process has ended. Since no internal pressure is built up, the motor vehicle tank also does not expand, so that the accuracy of the fill quantity determination in the motor vehicle tank is increased. Furthermore, the fact that no pressure needs to be built up in the motor vehicle tank to end the filling process offers the advantage that the amount of fuel filled into the motor vehicle tank corresponds more precisely to the amount of fuel to be filled into the motor vehicle tank. This is because the volume of gas remaining in the motor vehicle tank does not act as a compressible gas spring. The amount of fuel filled into the filler tube can be determined very precisely, so that the accuracy of the amount of fuel filled is increased.

Preferably, the at least one actuator is an electromagnet inserted in a filler neck.

Activation of the solenoid causes closing of a dispensing valve inserted into the filler tube, if the dispensing valve has appropriate functionality. A corresponding method in which the closing signal is sent to a check valve arranged in the filling tube or on the filling tube has the advantage that no internal pressure needs to be built up in the motor vehicle tank to end the filling process, so that the motor vehicle tank is essentially pressureless after the filling process has ended. Since no internal pressure is built up, the motor vehicle tank also does not expand, so that the accuracy of the fill quantity determination in the motor vehicle tank is increased. Furthermore, the fact that no pressure needs to be built up in the motor vehicle tank to end the filling process offers the advantage that the amount of fuel filled into the motor vehicle tank corresponds more precisely to the amount of fuel to be filled into the motor vehicle tank. This is because the volume of gas remaining in the motor vehicle tank does not act as a compressible gas spring.

Further preferably, the method is configured such that the method further comprises a method step for establishing a data exchange connection between the tank control device and the filling device, wherein the at least one actuator is arranged in the filling device and the closing signal is sent to the actuator via the data exchange connection.

The filling device can be a dispenser of a gas station. In particular, the filling device can be designed as a dispensing valve of a dispensing system. A corresponding method in which the closing signal is sent to a check valve arranged in the filling tube or on the filling tube has the advantage that no internal pressure needs to be built up in the motor vehicle tank to end the filling process, so that the motor vehicle tank is essentially pressureless after the filling process has ended. Since no internal pressure is built up, the motor vehicle tank also does not expand, so that the accuracy of the fill quantity determination in the motor vehicle tank is increased. Since no pressure needs to be built up in the motor vehicle tank to complete the filling process, the amount of fuel filled into the motor vehicle tank corresponds more precisely to the amount of fuel to be filled into the motor vehicle tank, since the volume of gas remaining in the motor vehicle tank does not act as a compressible gas spring. The amount of fuel filled into the filler tube can be determined very accurately because the geometry and dimensions of the filler tube are known, so the accuracy of the amount of fuel filled is increased.

More precisely, the task underlying the present disclosure is solved by a method for controlling a filling process of a motor vehicle tank, wherein the motor vehicle tank has a filler tube which opens into the motor vehicle tank and via which the motor vehicle tank can be filled by means of a filling device. The fuel tank further comprises a service and/or refueling vent valve that is electrically and/or electromagnetically actuable between an open position, in which the motor vehicle tank is at least indirectly fluidly connected to the atmosphere by means of the service and/or refueling vent valve, and a closed position, in which the motor vehicle tank is fluidly isolated from the atmosphere by means of the service and/or refueling vent valve. Furthermore, the motor vehicle tank has an electrically and/or electromagnetically actuable actuator by means of which termination of the filling process of the motor vehicle tank can be initiated. Further, the motor vehicle tank includes a filling level sensor for determining a filling level of the motor vehicle tank. The motor vehicle tank according to the disclosure is characterized in that it has a tank control device which is signal-coupled to the service and/or refueling vent valve and the actuator by means of a first data exchange connection and to the filling level sensor by means of a second data exchange connection, the tank control device being designed to carry out the above-described method steps.

For this purpose, the tank control device can comprise a data transceiver unit that is designed to receive data via the data exchange connection. The data transceiver unit is further adapted to transmit data. Preferably, the data can be sent from the data transceiver unit via the data exchange connection. However, the present disclosure is not limited thereto, as the data transceiver unit may also send data over a data link different from the data exchange link.

The method according to the disclosure has the advantage that the motor vehicle tank of a motor vehicle or of a PHEV can be filled only up to a predetermined maximum filling quantity depending on the geographical location of the motor vehicle or of the PHEV and thus depending on the geographical location of the motor vehicle tank, the maximum filling quantity corresponding to a predetermined shut-off filling volume of the motor vehicle tank. If, for example, in a city the vehicles moving in the geographical area of the city may only be filled and moved with a predetermined maximum filling quantity of fuel (for example 36 liters), the method according to the disclosure for controlling a filling process of the motor vehicle tank offers the advantage that the filling process of the motor vehicle tank is automatically stopped depending on the geographical location of the motor vehicle tank at a predetermined shut-off filling volume corresponding to the maximum filling quantity. After reaching the shut-off filling volume, refueling of the motor vehicle tank is not possible if the motor vehicle tank is in the predetermined geographical area. However, if the motor vehicle tank is not located in a geographical area that has limitations on the amount of fuel that can be carried, the motor vehicle tank can be filled as usual up to a maximum filling volume.

Thus, the motor vehicle tank according to the disclosure has the advantage that it can be installed and used independently of the locations where the motor vehicle or PHEV is used.

Of course, it is also possible that different shut-off filling volumes are defined for different geographical areas, which can be stored in an electronic memory of the tank control device. Furthermore, it is of course also possible that the shut-off filling volume(s) associated with a geographical area(s) can be changed. Thus, the method according to the disclosure offers, for example, the advantage that the motor vehicle tank can continue to be used even in the event of a change in a legal situation.

The tank control device can be designed as a separate electronic device. However, the tank control device can also be designed as part of an on-board computer system of the motor vehicle and represent a subunit of the on-board computer system.

Electrical and/or electromagnetic adjustability of an actuator means electromechanical adjustment of the actuator.

Preferably, the motor vehicle tank is designed in such a way that it has a data receiving unit via which data stored in an electronic data memory can be transmitted to the tank control device.

The correspondingly designed motor vehicle tank offers the advantage that actions such as a filling start and/or a filling stop of the motor vehicle tank can be initiated by an electronic unit comprising the electronic data memory and/or by a control device (for example, an on-board computer of the motor vehicle and/or a mobile terminal and/or the tank control device itself).

Further preferably, the motor vehicle tank is designed such that the tank control device further comprises a data output unit via which an opening signal and/or a closing signal can be output.

Further preferably, the motor vehicle tank is designed in such a way that the at least one actuator is designed as a service and/or refueling venting valve which is arranged in the motor vehicle tank, wherein the service and/or refueling venting valve can be actuated electrically and/or electromagnetically between an open position and a closed position, wherein, in the open position of the service and/or refueling vent valve, the motor vehicle tank is fluid-connected to a vent line by means of the service and/or refueling vent valve, and wherein, in the closed position of the service and/or refueling vent valve, the motor vehicle tank is fluid-separated from the vent line by means of the service and/or refueling vent valve.

The use of the service and/or refueling vent valve to terminate a refueling process offers the advantage that valve devices necessary anyway for the operation of the motor vehicle tank are used to terminate the refueling process electrically and/or electromagnetically, so that no further components need to be installed in the fuel tank, thus not increasing the complexity of the appropriately designed motor vehicle tank.

Preferably, the motor vehicle tank is designed in such a way that the at least one actuator is designed as a check valve which is arranged in a filler tube opening into the motor vehicle tank, wherein the check valve can be actuated electrically and/or electromagnetically between an open position and a closed position, wherein in the open position of the check valve the motor vehicle tank is fluid-connected to the filler tube, and wherein in the closed position of the check valve the motor vehicle tank is fluid-separated from the filler tube by means of the check valve or the clear width of the filler tube is reduced by means of the check valve.

Further preferably, the motor vehicle tank is designed in such a way that the at least one actuator is designed as an interference body which is arranged in the filler tube opening into the motor vehicle tank, wherein the interference body can be actuated electrically and/or electromagnetically between an open position and an interference position, wherein in the open position of the interference body a clear width of the filler tube is not reduced, and wherein in the interference position of the interference body the latter projects into the filler tube and reduces the clear width of the filler tube.

Further preferably, the motor vehicle tank is designed in such a way that the at least one actuator is designed as a shut-off valve which is arranged between the motor vehicle tank and an activated carbon filter, wherein the shut-off valve can be actuated electrically and/or electromagnetically between an open position and a closed position, wherein in the open position of the shut-off valve the motor vehicle tank is fluid-connected to the activated carbon filter by means of the shut-off valve, and wherein in the closed position of the shut-off valve the motor vehicle tank is fluid-separated from the activated carbon filter by means of the shut-off valve.

Further preferably, the motor vehicle tank is designed such that the at least one actuator is designed as an electromagnet which is arranged in a filler neck of the filler tube opening into the motor vehicle tank, wherein the electromagnet can be actuated between an active state and a passive state, wherein in the active state the electromagnet generates a magnetic field, and wherein in the passive state the electromagnet does not generate a magnetic field.

The four last-described embodiments of the motor vehicle tank offer the advantage that no internal pressure needs to be built up in the motor vehicle tank to terminate the filling process, so that the motor vehicle tank is essentially pressureless after the filling process is terminated. Since no internal pressure is built up, the motor vehicle tank also does not expand, so that the accuracy of the fill quantity determination in the motor vehicle tank is increased. Furthermore, the fact that no pressure needs to be built up in the motor vehicle tank to end the filling process offers the advantage that the amount of fuel filled into the motor vehicle tank corresponds more precisely to the amount of fuel to be filled into the motor vehicle tank. This is because the volume of gas remaining in the motor vehicle tank does not act as a compressible gas spring. The amount of fuel filled into the filler tube can be determined very precisely, so that the accuracy of the amount of fuel filled is increased.

Further preferably, the motor vehicle tank is designed in such a way that the signal dependent on the comparison of the filling volume of the motor vehicle tank with the predetermined shut-off filling volume is output via a signal transmission device.

For example, the signal can be displayed in a dashboard of the motor vehicle and/or on a display device of a mobile terminal (for example, a smartphone). Furthermore, the signal can be transmitted acoustically. Furthermore, it is possible that the signal is transmitted to the driver via a vibration generating device.

BRIEF DESCRIPTION OF THE DRAWINGS

Further advantages, details, and features of the disclosure will be apparent below from the examples of embodiments explained. Thereby show in detail.

DETAILED DESCRIPTION

In the description that now follows, the same reference signs designate the same components or the same features, so that a description carried out in relation to one figure with regard to one component also applies to the other figures, so that a repetitive description is avoided.

Figure 1:
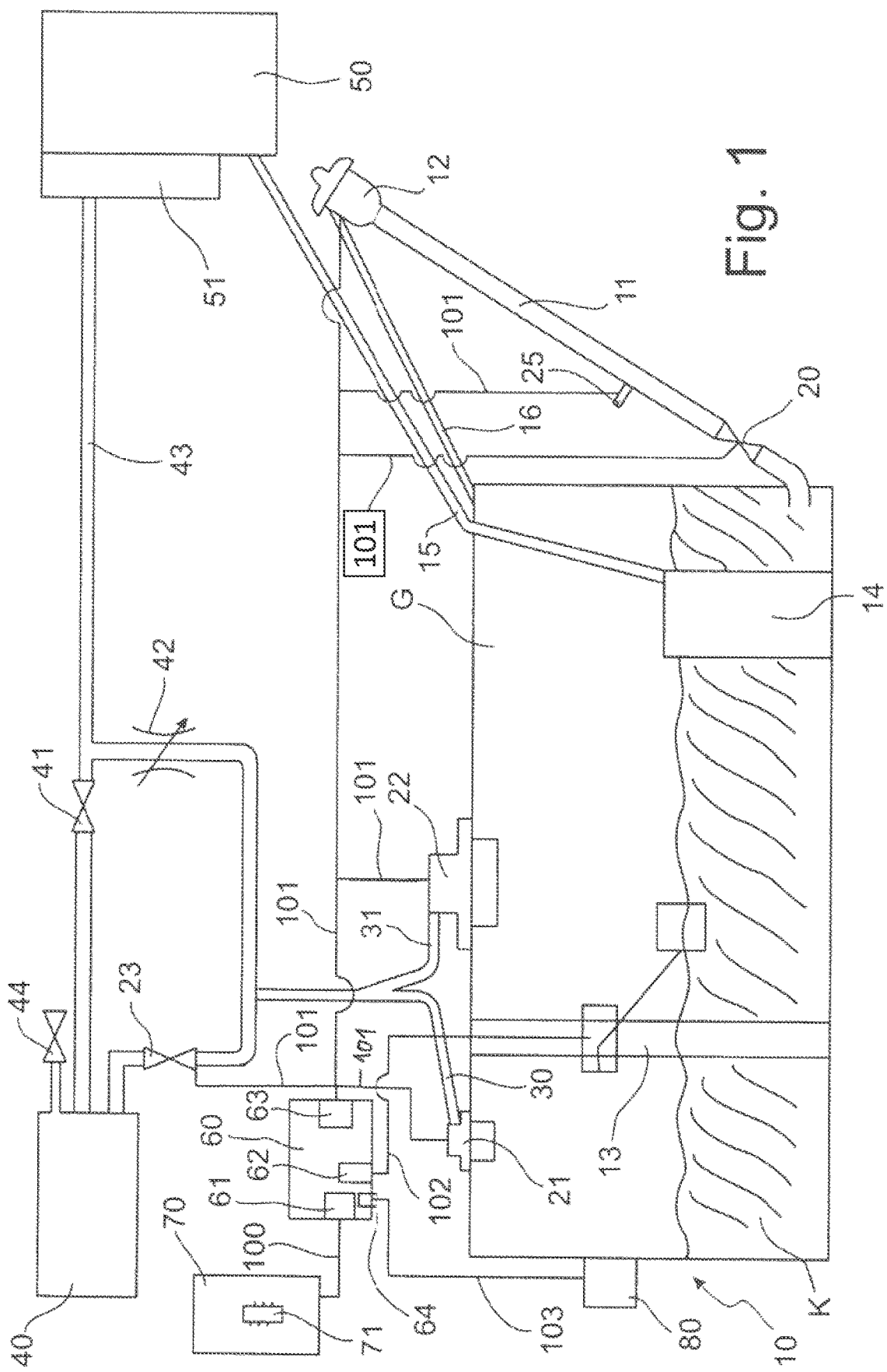
FIG. 1: a schematic representation of a motor vehicle tank according to the disclosure, which is designed for carrying out the method of filling the motor vehicle tank according to the disclosure.

FIG. 1: a schematic representation of a motor vehicle tank 10 according to the disclosure, which is designed for carrying out the method of filling the motor vehicle tank 10 according to the disclosure. The motor vehicle tank 10 accommodates a certain amount of fuel K and, in addition, a volume of gas G typically saturated with hydrocarbons. For filling fuel K, the motor vehicle tank 10 has a filler tube 11, at the end of which facing away from the fuel tank 10 a filler neck 12 is arranged. Further, the motor vehicle tank 10 houses a fuel delivery device 14, also referred to as a fuel pump 14. The fuel pump 14 is fluidly connected via a fuel line 15 to an engine 50 of a motor vehicle (not shown in the figure) for delivering fuel K to the engine 50. Further, the motor vehicle tank 10 may include a recirculation line 16 fluidly connected to the motor vehicle tank 10 and a volume enclosed by the filler neck 12. The recirculation line 16 is used for a gas exchange between the motor vehicle tank 10 and the filler neck 12 during a refueling operation of the motor vehicle tank 10, and is only optional and usually provided for the U.S. market.

The motor vehicle tank 10 according to the disclosure comprises a tank control device 60, which comprises a data receiving unit 61, via which electronic data can be transmitted to the tank control device 60. It can be seen from FIG. 1 that the data receiving unit 61 is connected to an electronic unit 70 via a data line 100, so that a data exchange connection between the tank control device 60 and the electronic unit 70 is made possible. The electronic unit 70, in turn, includes an electronic data memory 71, so that the data stored in the electronic data memory 71 can be transmitted to the tank control device 60 via the data line 100. The data line 100 may be such that data can be transmitted bidirectionally between the electronic unit 70 and the tank control device 60. However, the data line 100 may also be such that only data can be transmitted from the electronic unit 70 to the tank control device 60. The electronic unit 70 may be, for example, a navigation system that is part of the motor vehicle and/or part of a mobile terminal, wherein the mobile terminal may be, for example, a smartphone. Furthermore, the electronic unit 70 may be, for example, an on-board computer of the motor vehicle comprising the motor vehicle tank 10. Furthermore, it is also possible that the electronic unit 70 is a data processing unit configured to generate and provide a data cloud.

The data line 100 enables transmission of electrical signals between the electronics unit 70 and the tank control device 60. Furthermore, it is also possible that the data line 100 is configured to wirelessly transmit data between the electronic unit 70 and the tank control device 60. For example, data representing the geographical location of the motor vehicle, and thus the motor vehicle tank 10, may be transmitted to the tank control device 60 via the data line 100.

Furthermore, it can be seen from FIG. 1 that the tank control device 60 comprises a data output unit 63 via which data and/or signals can be transmitted to electrically and/or electromagnetically actuable actuators 20, 21, 22, 23, 24, 25 via a first data exchange connection 101. The first data exchange connection 101 may also be referred to as the first data line, or the first signal line or, more generally, the first electrical line. The actuators 20-25, to be specified further below, are configured to initiate termination of a filling operation of the motor vehicle tank 10. To this end, the tank control device 60 is configured to transmit to one or more of the actuators 20-25 a closing signal, which may also be referred to as a filling stop signal, via the first data exchange connection 101 such that upon receipt of the filling stop signal, at least one of the actuators 20-25 initiates termination of the filling process in a manner to be specified further below.

Referring to FIG. 1, the motor vehicle tank 10 further comprises a filling level sensor 13 connected to the tank control device 60 via a second data exchange connection 102 in the form of a data line. To transmit data from the filling level sensor 13 to the tank control device 60, the latter comprises a second data receiving unit 62. The filling level sensor 13 is designed to transmit the data representing a filling level of the motor vehicle tank 10 determined by means of the filling level sensor 13 to the tank control device 60 via the second data exchange connection 102.

Thus, the amount of fuel K filled into the motor vehicle tank 10 can be checked in real time and evaluated by the tank control device 60, and when the amount of fuel to be filled is reached, the filling stop signal is output to at least one of the actuators 20-25, whereupon the filling operation is stopped.

FIG. 1 shows the motor vehicle tank 10 with actuators 20-25. However, the present disclosure is not to be understood such that all actuators 20-25 are necessary to initiate termination of a filling operation of the motor vehicle tank 10. Rather, termination of a filling process of the motor vehicle tank 10 may be initiated by only a single electrically and/or electromagnetically actuatable actuator 20-25. Consequently, the present disclosure is to be understood in such a way that the motor vehicle tank 10 according to the disclosure may also comprise only one electrically and/or electromagnetically actuatable actuator 20-25. Therefore, FIG. 1 is to be understood as showing that the motor vehicle tank 10 has at least one of the electrically and/or electromagnetically operable actuators 20-25. However, the motor vehicle tank 10 may also include a plurality of the electrically and/or electromagnetically actuatable actuators 20-25. A filling operation can also be performed by means of the outlet (exhaust) valve 41 (e.g. purge valve) and/or by means of the diagnostic valve 44 (e.g. OBD valve).

The motor vehicle tank 10 according to the disclosure is adapted to establish a data exchange connection between the tank control device 60 and the electronic data memory 71 of the electronic unit 70. The motor vehicle tank 10 according to the disclosure is further configured to determine a quantity of fuel to be filled into the motor vehicle tank 10 by means of data transmitted from the electronic data memory 71 via the data line 100.

The method steps of establishing the data exchange connection and determining the amount of fuel to be filled into the motor vehicle tank 10 can be performed by the on-board tank control device 60 and/or also by the electronic unit 70. The amount of fuel to be added can be determined in a variety of ways. For example, the amount of fuel to be filled in can be transmitted from the electronic unit 70. For this purpose, the electronic unit 70 then has all the necessary information to determine/calculate the amount of fuel to be filled in.

Figure 3:
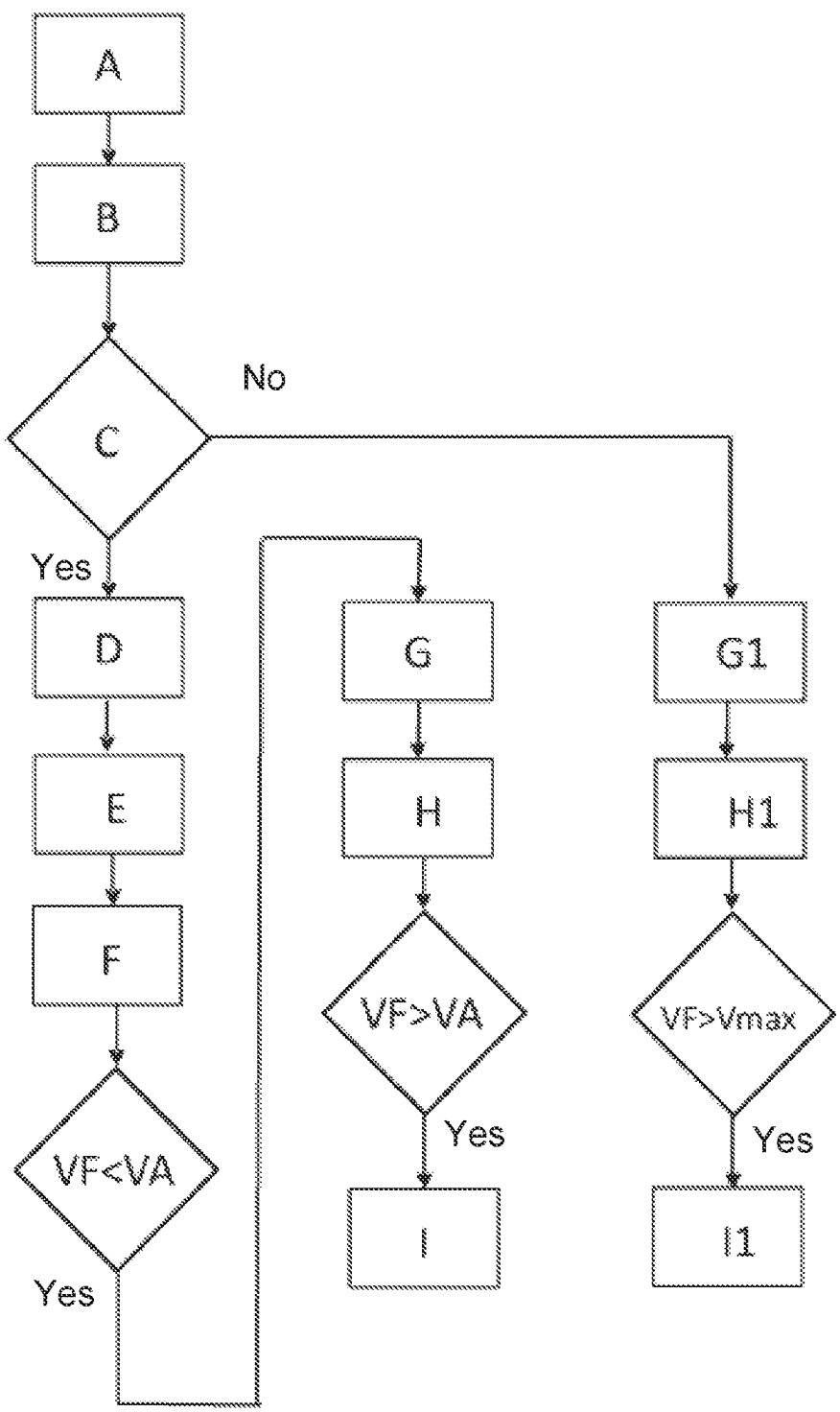
FIG. 3: a process flow diagram of a method according to the disclosure for controlling a filling process of the motor vehicle tank shown in FIG. 1.

In the following, a method for controlling a filling process of the motor vehicle tank 10 is described with reference to FIG. 3. In a method step A, it is determined whether a filling process of the motor vehicle tank 10 is to be initiated. For this purpose, for example, a position of a tank flap (not shown in the figures) can be determined which covers the filler neck 12 in a closed position of the tank flap and exposes it in an open position of the tank flap.

In a method step B, a geographical location of the motor vehicle tank 10 is determined. For this purpose, for example, corresponding location data is transmitted from the electronic unit 70 or its electronic memory 71 to the tank control device 60 via the data line 100.

In a method step C determining, by means of the tank control device 60, whether the geographical location of the motor vehicle tank 10 is within a predetermined geographical area.

If the geographical location of the motor vehicle tank 10 is within the predetermined geographical area, in method step D, determining a predetermined shut-off filling volume $V_A$ dependent on the geographical location of the motor vehicle tank 10.

Subsequently, in a method step E, a filling volume $V_F$ of the motor vehicle tank 10 is determined by means of the filling level sensor 13 and transmitted to the tank control device 60 via the second data exchange connection 102.

In a method step F, the tank control device 60 compares the filling volume $V_F$ of the motor vehicle tank 10 with the predetermined shut-off filling volume $V_A$.

If the filling volume $V_F$ is less than the predetermined shut-off filling volume $V_A$, in a method step G an opening signal is output from the tank control device 60 to the actuator 21 and/or 22, in a form of service and/or refueling vent valves, respectively, whereupon in a method step H the actuator 21 and/or 22 (as service and/or refueling vent valves) is transferred to its open position on receipt of the opening signal.

With continuous determination of the filling volume $V_F$ of the motor vehicle tank 10 by means of the filling level sensor 13, in a method step I, a closing signal is output by the tank control device 60 to at least one of the actuators 20, 21, 22, 23, 24, 25, 44 when the filling volume $V_F$ of the motor vehicle tank 10 has reached or exceeded the predetermined shut-off filling volume $V_A$.

If it is determined in the method step C that the geographical location of the motor vehicle tank 10 is outside the predetermined geographical area and the filling volume $V_F$ of the motor vehicle tank 10 is less than a predetermined maximum filling volume $V_{max}$ of the fuel tank 10, in a method step G1, an opening signal is output from the tank control device 60 to the actuator 21 and/or 22, in a form of service and/or refueling vent valves, respectively, whereupon, in a method step H1, the actuator 21 and/or 22 (as service and/or refueling vent valves) is transferred to its open position upon receipt of the opening signal.

With continuous determination of the filling volume of the motor vehicle tank 10 by means of the filling level sensor 13, in a method step I1 a closing signal is output by the tank control device 60 to at least one of the actuators 20, 21, 22, 23, 24, 25, 44 when the filling volume of the motor vehicle tank 10 has reached or exceeded the predetermined maximum filling volume $V_{max}$.

According to a first embodiment of the present disclosure, the electrically and/or electromagnetically operable actuator 22 is configured as a refueling vent valve arranged in/on the motor vehicle tank 10. In the illustrated embodiment, the electrically and/or electromagnetically operable actuator 21, configured as a service vent valve 21, is closed during refueling. When a closing signal, which may also be referred to as a filling stop signal, is received and output from the tank control device 60 to the actuator (refueling vent valve) 22 via the data output unit 63, the actuator (refueling vent valve) 22 closes so that venting of the motor vehicle tank 10 is prevented during the refueling operation. As fuel is further introduced into the motor vehicle tank 10 via the filler tube 11, the internal tank pressure increases so that fuel introduced into the filler tube 11 rises in the filler tube 11 until the fuel reaches a shut-off hole 91 of an inserted dispensing (valve) nozzle 90, thereby terminating the filling operation.

The actuator (refueling vent valve) 22 is electrically and/or electromagnetically actuable/adjustable between an open position and a closed position, wherein in the open position thereof, the motor vehicle tank 10 is fluidly connected to the atmosphere via the actuator (refueling vent valve) 22, and wherein in the closed position, actuator (refueling vent valve) 22 the motor vehicle tank 10 is fluidly isolated from the atmosphere.

FIG. 1 shows that the fluid connection of the motor vehicle tank 10 to the atmosphere is via an activated carbon filter 40 and an outlet (exhaust) valve 41 or diagnostic valve 44, but the activated carbon filter 40 is not mandatory but optional for the present disclosure.

In a second embodiment of the present disclosure, the motor vehicle tank 10 includes an activated carbon filter 40 fluidly connected to the actuator (service vent valve) 21 and the actuator (refueling vent valve) 22, and thus to the motor vehicle tank 10, via actuator 23, in a form of a shutoff valve. In the illustrated embodiment, the actuator (service vent valve) 21 and the actuator (refueling vent valve) 22 do not necessarily have to be electrically and/or electromagnetically operable, but only the actuator (shut-off valve) 23 must be electrically and/or electromagnetically operable. However, it is of course also possible that also in the second embodiment of the present disclosure the actuator (service vent valve) 21 and also the actuator (refueling vent valve) 22 are electrically and/or electromagnetically operable in addition to the actuator (shut-off valve) 23.

The actuator (shut-off valve) 23 is arranged between the motor vehicle tank 10 and the activated carbon filter 40 and is electrically and/or electromagnetically actuable/adjustable between an open position and a closed position, wherein in the open position of the actuator (shut-off valve) 23 the motor vehicle tank 10 is fluidly connected to the activated carbon filter 40 by means of the actuator (shut-off valve) 23, and wherein in the closed position of the actuator (shut-off valve) 23 the motor vehicle tank 10 is fluidly separated from the activated carbon filter 40 by means of the actuator (shut-off valve) 23. Upon receiving a closing signal, which may also be referred to as a filling stop signal, transmitted from the data output unit 63 of the fuel tank control device 60 to the actuator (shut-off valve) 23 via the first data exchange connection 101, the actuator (shut-off valve) 23 closes so that venting of the fuel tank 10 during the refueling operation is prevented, so that by filling fuel into the motor vehicle tank 10 via the filler tube 11, the internal pressure thereof increases. As fuel is further introduced into the motor vehicle tank 10 via the filler tube 11, the internal tank pressure increases so that fuel introduced into the filler tube 11 rises in the filler tube 11 until the fuel reaches a shut-off hole 91 of an inserted dispensing (valve) nozzle 90, thereby terminating the filling operation.

In a third embodiment of the present disclosure, the actuator 20 is configured as a check valve disposed in the filler tube 11. The actuator (check valve) 20 is electrically and/or electromagnetically actuable between an open position and a closed position, wherein in the open position of the actuator (check valve) 20 the motor vehicle tank 10 is fluidly connected to the filler tube 11, and wherein in the closed position of the actuator (heck valve) 20 the motor vehicle tank 10 is fluidly separated from the filler tube 11 by means of the actuator (check valve 20) or at least the clear width of the filler tube 11 is reduced by means of the actuator (check valve) 20.

Upon receipt of a closing signal, which may also be referred to as a filling stop signal and which is output from the data output unit 63 of the tank control device 60 to the actuator (check valve) 20 via the first data exchange connection 101, the actuator (check valve 20) is transferred to its closed position, whereupon fuel introduced into the filler tube 11 can no longer be introduced into the motor vehicle tank 10 or can only be introduced at a slower rate. As fuel is further introduced into the motor vehicle tank 10 via the filler tube 11, the internal tank pressure increases so that fuel introduced into the filler tube 11 rises in the filler tube 11 until the fuel reaches a shut-off hole 91 of an inserted dispensing (valve) nozzle 90, thereby terminating the filling operation.

A suitably configured motor vehicle tank 10 offers the advantage that no pressure needs to be built up within the motor vehicle tank 10 to terminate the filling process, so that the fuel tank 10 is substantially depressurized after the filling process is terminated. This reduces loading of any activated carbon filter 40 that may be provided. Furthermore, it is also possible to determine a fuel quantity in the motor vehicle tank 10 with an increased accuracy, since no deformation or a reduced deformation of the motor vehicle tank 10 is achieved due to the motor vehicle tank 10 not being pressurized.

According to a fourth embodiment of the present disclosure, the at least one electrically and/or electromagnetically actuatable actuator 25 is configured as an interference body 25 arranged in the filler tube 11. The actuator (interference body) 25 can be electrically and/or electromagnetically actuated/adjusted between an open position and an interference position, wherein in the open position of the actuator (interference body) 25 the clear width of the filler tube 11 is not reduced, and wherein in the interference position of the actuator (interference body) 25 the latter projects into the filler tube 11 and thus reduces the clear width of the filler tube 11.

Upon receipt of a closing signal, which may also be referred to as a filling stop signal and which is output from the data output unit 63 of the tank control device 60 to the actuator (check valve) 20 via the first data exchange connection 101, the actuator (check valve) 20 is transferred to its closed position, whereupon fuel introduced into the filler tube 11 can no longer be introduced into the motor vehicle tank 10 or can only be introduced at a slower rate. As fuel is further introduced into the motor vehicle tank 10 via the filler tube 11, the internal tank pressure increases so that fuel introduced into the filler tube 11 rises in the filler tube 11 until the fuel reaches a shut-off hole 91 of an inserted dispensing (valve) nozzle 90, thereby terminating the filling operation.

A suitably configured motor vehicle tank 10 offers the advantage that no pressure needs to be built up within the motor vehicle tank 10 to terminate the filling process, so that the fuel tank 10 is substantially depressurized after the filling process is terminated. This reduces loading of any activated carbon filter 40 that may be provided. Furthermore, it is also possible to determine a fuel quantity in the motor vehicle tank 10 with an increased accuracy, since no deformation or a reduced deformation of the motor vehicle tank 10 is achieved due to the motor vehicle tank 10 not being pressurized.

Figure 2:
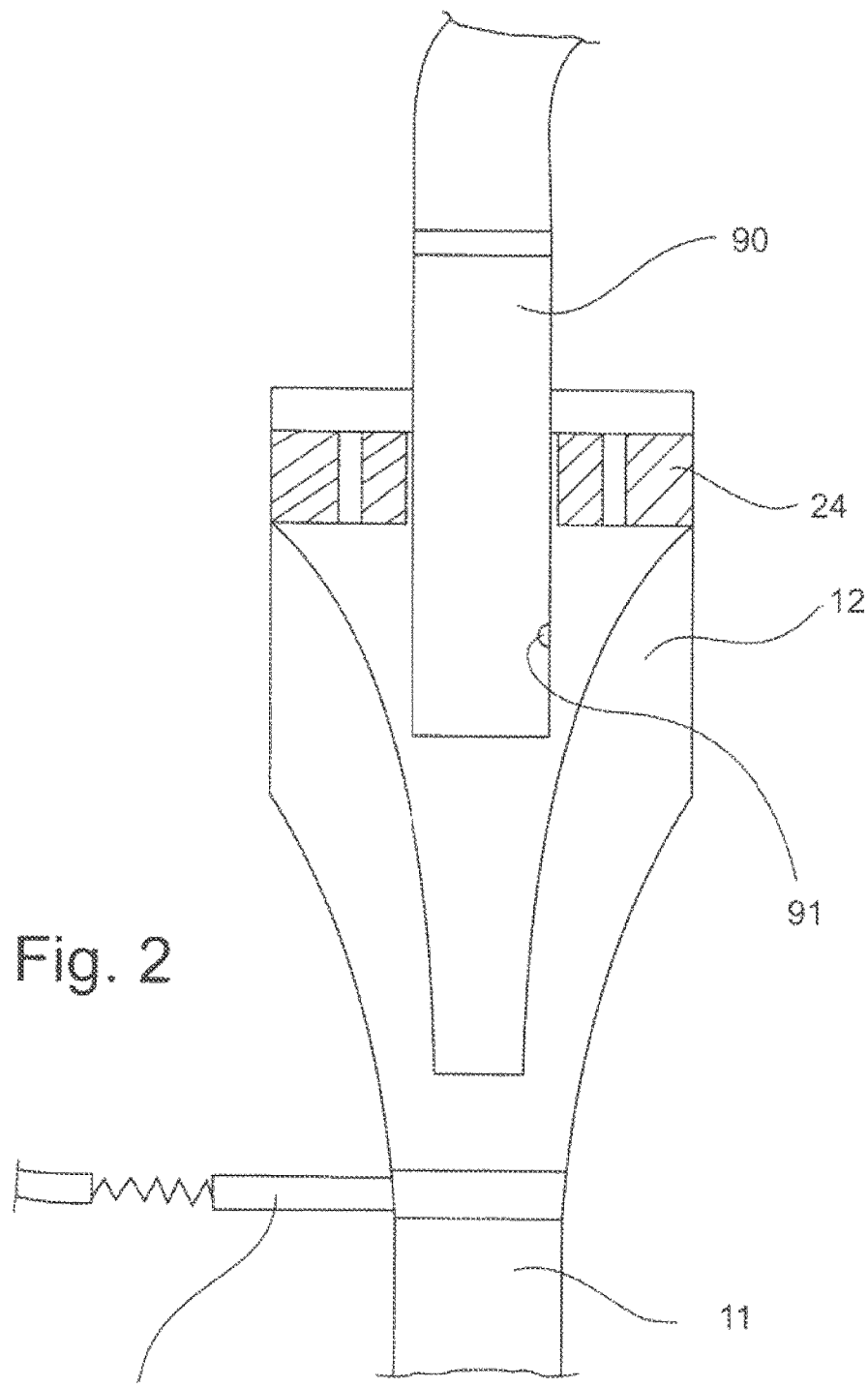
FIG. 2: a schematic sectional view of a filler tube including filler neck of a motor vehicle tank according to the disclosure.

FIG. 2 shows a schematic cross-section of a filler neck 12 together with a filler tube 11 of a motor vehicle tank 10 according to a fifth embodiment of the present disclosure. In the motor vehicle tank 10 according to the fifth embodiment of the present disclosure, the at least one actuator 24 is configured as an electromagnet 24 arranged in the filler neck 12. In the illustrated embodiment, the actuator (electromagnet) 24 is in the form of a ring magnet 24. In this regard, the actuator (electromagnet) 24 is operable between an active state and a passive state, wherein in the active state the actuator (electromagnet) 24 generates a magnetic field, and wherein in the passive state the actuator (electromagnet 24) does not generate a magnetic field.

By transmitting a closing signal, which may also be referred to as a filling stop signal, from the data output unit 63 of the tank control device 60 to the actuator 24, in a form of a solenoid, is changed to its passive state so that no magnetic field is generated and consequently a dispensing (valve) nozzle 90 inserted into the filler neck 12 is closed. An appropriately designed motor vehicle tank 10 offers the advantage that no pressure build-up is required within the motor vehicle tank 10 to terminate a filling process, so that, on the one hand, an optionally provided activated carbon filter 40 is less heavily loaded and, moreover, no deformation of the motor vehicle tank 10 occurs as a result of pressurization, thereby enabling increased accuracy in determining a filling condition of the motor vehicle tank 10. In addition, the motor vehicle tank 10 according to the fifth embodiment offers the advantage that the filler tube 11 does not even have to be filled with fuel to end the filling process, so that a very precise filling stop can be achieved. Furthermore, the motor vehicle tank 10 according to the fifth embodiment offers the advantage that no shut-off delay caused by a dispensing (valve) nozzle 90 occurs when the filling process is terminated.

Referring to FIG. 1, the motor vehicle tank 10 may further comprise a tilt (inclination) sensor 80 for determining a tilt/inclination of the motor vehicle tank 10. The tilt (inclination) sensor 80 is not mandatory but merely optional. In this case, the tilt (inclination) sensor 80 is connected to the tank control device 60 via a third data exchange connection 103 in the form of a third data line 103, the third data line 103 being connected to a third data receiving unit 64 of the tank control device 60. The tilt (inclination) sensor 80 is configured to transmit data representing the tilt/inclination of the motor vehicle tank 10 to the tank control device 60 via the data determined by the tilt (inclination) sensor 80.

In this case, the tank control device 60 is configured to receive the data transmitted by the tilt (inclination) sensor 80 in addition to the data transmitted by the filling level sensor 13, and to determine an actual filling level of the motor vehicle tank 10 taking into account the data transmitted by the filling level sensor 13 and the tilt (inclination) sensor 80. Thus, the determination of the filling level of the motor vehicle tank 10 is enabled even more precisely, since an tilted/inclined position of the motor vehicle and thus of the motor vehicle tank 10 can be taken into account.

The motor vehicle tank 10 has to be designed to take into account a spatial position resp. inclination of the motor vehicle tank 10 does not necessarily have the tilt (inclination) sensor 80, since a tilt/inclination sensor is usually present in an on-board electronic system of a motor vehicle, the data of which can be transmitted to the third data receiving unit 64 of the tank control device 60.

In the motor vehicle tank 10 shown in FIG. 1, the activated carbon filter 40 is fluidly connected to an intake tract 51 of the engine 50 via an output (exhaust) valve 41 and a flush (purge) line 43. Thus, flushing of the activated carbon filter 40 by intake air from the engine 50 is enabled.

LIST OF REFERENCE SIGNS

- 10 Motor vehicle tank
- 11 Filler tube (of the motor vehicle tank)
- 12 Filler neck
- 13 Filling level sensor
- 14 Fuel delivery device/fuel pump
- 15 Fuel line
- 16 Recirculation line
- 20 Actuator/check valve
- 21 Actuator/service vent valve
- 22 Actuator/refueling vent valve
- 23 Actuator/Shut-off valve/FTIV
- 24 Actuator/electromagnet (inside filler neck)
- 25 Actuator/interference body (inside the filler neck)
- 30 Service vent line
- 31 Refueling vent line
- 40 Activated carbon filter
- 41 Output (exhaust) valve/purge valve
- 42 Throttle valve
- 43 Flush (purge) line
- 44 Diagnostic valve/OBD valve
- 50 Engine
- 51 Intake tract (of the engine)
- 60 Tank control device (of motor vehicle tank)
- 61 (first) Data receiving unit (of the tank control device)
- 62 (second) Data receiving unit (of the tank control device)
- 63 Data output unit
- 64 (third) Data receiving unit (of tank control device)
- 70 Electronic unit/on-board computer/mobile terminal/data processing system (for generating and providing a data cloud)
- 71 Electronic data memory (of the electronics unit)
- 80 Tilt (inclination) sensor
- 90 Dispensing (valve) nozzle
- 91 Shut-off hole
- 100 Data line (between electronic unit and tank control device)
- 101 (first) Data exchange connection/data line/signal line/electrical line
- 102 (second) Data exchange connection/data line/signal line/electrical line
- 103 (third) Data exchange connection/data line/signal line/electrical line
- G Gas volume (in motor vehicle tank)
- K Fuel (in motor vehicle tank)
- $V_A$ Shut-off filling volume
- $V_F$ Filling volume (of the motor vehicle tank)
- $V_{max}$ Maximum filling volume (of the motor vehicle tank)

What is claimed is:

1. A method for controlling a filling process of a motor vehicle tank, the method comprising:
    determining a geographical location of the motor vehicle tank by an electronic unit;
    transmitting the geographical location of the motor vehicle tank determined by the electronic unit to a tank control device;
    determining, by the tank control device, that the geographical location of the motor vehicle tank is within a predetermined geographical area;
    determining, by the tank control device, a shut-off filling volume dependent on the geographical location of the motor vehicle tank in response to the geographical position of the motor vehicle tank being within the predetermined geographical area;
    determining that a filling operation of the motor vehicle tank is to be initiated;
    outputting an opening signal from the tank control device to at least one vent valve when a filling volume of the motor vehicle tank is less than the shut-off filling volume; and
    moving the at least one vent valve to its open position upon receipt of the opening signal.

2. The method according to claim 1, wherein the at least one vent valve comprises a service vent valve and/or a refueling vent valve.

3. The method according to claim 1, further comprising:
    outputting a closing signal from the tank control device to at least one actuator when the filling volume of the motor vehicle tank has reached or exceeded the shut-off fill volume.

4. The method according to claim 3, wherein the at least one actuator is electrically and/or electromagnetically actuable.

5. The method according to claim 3, wherein the at least one actuator is the at least one vent valve.

6. The method according to claim 3, wherein the at least one actuator is a check valve arranged in and/or on a filler tube of the motor vehicle tank.

7. The method according to claim 3, wherein the at least one actuator is a shut-off valve arranged between the motor vehicle tank and an activated carbon filter and/or between the activated carbon filter and atmosphere.

8. The method according to claim 3, wherein the at least one actuator is an interfering body arranged in and/or on a filler tube of the motor vehicle tank.

9. The method according to claim 3, wherein the at least one actuator is electronic magnet arranged in and/or on a filler tube of the motor vehicle tank.

10. The method according to claim 3, wherein the method further comprises establishing a data exchange connection between the tank control device and a filling device, wherein the at least one actuator is disposed in the filling device and the closing signal is sent to the at least one actuator via the data exchange connection.

11. A motor vehicle tank, comprising:
    a filler tube opening into the motor vehicle tank, the filler tube configured to fill the motor vehicle tank by a filling device;
    at least one vent valve which is electrically and/or electromagnetically actuable between an open position, in which the motor vehicle tank is at least indirectly fluidly connected to atmosphere by the at least one vent valve, and a closed position, in which the motor vehicle tank is fluidly separated from the atmosphere by the at least one vent valve;
    at least one actuator which is an electrically and/or electromagnetically actuable and configured to initiate termination of a filling process of the motor vehicle tank;
    a filling level sensor for determining a filling level of the motor vehicle tank;
    wherein the motor vehicle tank comprises an electronic unit configured to determine a geographical location of the motor vehicle tank and to transmit the determined geographical location to a tank control device;

wherein the tank control device is signal-coupled to the at least one vent valve and the at least one actuator by a first data exchange connection and to the filling level sensor by a second data exchange connection; and wherein the tank control device is configured to perform the method of claim 1.

12. The motor vehicle tank according to claim 11, further comprising a data receiving unit configured to transmit data stored in an electronic data memory to the tank control device.

13. The motor vehicle tank according to claim 11, wherein the tank control device further comprises a data output unit configured to output an opening signal and/or a closing signal.

14. The motor vehicle tank according to claim 11, comprising the following features:

the at least one actuator is provided as the at least one vent valve which is arranged in the motor vehicle tank;

in the open position of the at least one vent valve, the motor vehicle tank is fluidly connected to a vent line by the at least one vent valve; and in the closed position of the at least one vent valve, the motor vehicle tank is fluidly separated from the vent line by the at least one vent valve.

15. The motor vehicle tank according claim 11, comprising the following features:

the at least one actuator is provided as a check valve, which is arranged in a filler tube opening into the motor vehicle tank;

the vent check valve is electrically and/or electromagnetically actuable between an open position and a closed position;

in the open position of the check valve, the motor vehicle tank is fluidly connected to the filler tube;

in the closed position of the check valve, the motor vehicle tank is fluidly separated from the filler tube by the check valve or a clear width of the filler tube is reduced by the check valve.

16. The motor vehicle tank according to claim 11, comprising the following features:

the at least one actuator is provided as an interference body, which is arranged in a filler tube opening into the motor vehicle tank;

the interference body is electrically and/or electromagnetically actuable between an open position and an interference position;

in the open position of the interference body, a clear width of the filler tube is not reduced; and in the interference position of the interference body, the interference body projects into the filler tube and reduces the clear width of the filler tube.

17. The motor vehicle tank according to claim 11, comprising the following features:

the at least one actuator is provided as a shut-off valve, which is arranged between the motor vehicle tank and an activated carbon filter;

the shut-off valve is electrically and/or electromagnetically actuable between an open position and a closed position;

in the open position of the shut-off valve, the motor vehicle tank is fluidly connected to the activated carbon filter by the shut-off valve; and in the closed position of the shut-off valve, the motor vehicle tank is fluidly separated from the activated carbon filter by the shut-off valve.

18. The motor vehicle tank according to claim 11, comprising the following features:

the at least one actuator is provided as an electromagnet which is arranged in a filler neck of the filler tube opening into the motor vehicle tank;

the electromagnet is operable between an active state and a passive state;

in the active state, the electromagnet generates a magnetic field; and in the passive state, the electromagnet does not generate a magnetic field.

19. The motor vehicle tank according to claim 11, wherein the opening signal is output via a signal transmission device.

* * * * *